United States Patent
Lee et al.

(10) Patent No.: US 7,499,455 B2
(45) Date of Patent: Mar. 3, 2009

(54) TRANSMITTING AND RECEIVING CONTROL INFORMATION FOR MULTIMEDIA BROADCAST/MULTICAST SERVICE IN MOBILE COMMUNICATION SYSTEM

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 487 days.

(21) Appl. No.: 11/052,983

(22) Filed: Feb. 8, 2005

(65) Prior Publication Data

US 2005/0213583 A1    Sep. 29, 2005

(30) Foreign Application Priority Data

Feb. 13, 2004 (KR) .................. 10-2004-0009772

(51) Int. Cl.
*H04L 12/28* (2006.01)
(52) U.S. Cl. ............... 370/395.5; 370/312; 370/342; 455/452.2
(58) Field of Classification Search ............. 370/328, 370/329, 330, 395, 458–462, 468, 312, 342, 370/395.1, 395.5; 455/418–420, 434, 464, 455/450, 452.1, 452.2
See application file for complete search history.

(56) References Cited

U.S. PATENT DOCUMENTS

| | | | |
|---|---|---|---|
| 6,934,284 B1 * | 8/2005 | Danielson et al. | 370/384 |
| 2002/0004818 A1 * | 1/2002 | Lansio et al. | 709/203 |
| 2003/0169723 A1 * | 9/2003 | Diachina et al. | 370/349 |
| 2003/0194992 A1 * | 10/2003 | Kim et al. | 455/414.1 |
| 2004/0037243 A1 * | 2/2004 | Inoue et al. | 370/329 |
| 2004/0081192 A1 * | 4/2004 | Koulakiotis et al. | 370/432 |
| 2004/0137885 A1 * | 7/2004 | Sarkkinen et al. | 455/414.1 |
| 2004/0180675 A1 * | 9/2004 | Choi et al. | 455/458 |
| 2004/0180681 A1 * | 9/2004 | Jeong et al. | 455/503 |
| 2004/0209610 A1 * | 10/2004 | Adwankar et al. | 455/419 |

FOREIGN PATENT DOCUMENTS

| | | |
|---|---|---|
| EP | 0928119 A2 | 7/1999 |
| EP | 1353523 A1 | 10/2003 |
| EP | 1501328 A2 | 1/2005 |

* cited by examiner

*Primary Examiner*—Nhan T Le
(74) *Attorney, Agent, or Firm*—Lee Hong Degerman Kang & Waimey

(57) ABSTRACT

To minimize data loss as a mobile terminal unnecessarily reads an MBMS control channel (MCCH) in the course of receiving MBMS data, an MBMS control information reception indication message comprising attribute information of control information for an MBMS service is transmitted to the mobile terminal. The mobile terminal then selectively reads the MCCH to receive the control information according to the attribute information contained in the indication message.

41 Claims, 4 Drawing Sheets

TRANSMITTING AND RECEIVING CONTROL INFORMATION FOR MULTIMEDIA BROADCAST/MULTICAST SERVICE IN MOBILE COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 2004-0009772, filed on Feb. 13, 2004, the contents of which is hereby incorporated by reference herein in their entirety.

BACKGROUND OF THE INVENTION

1. Field of the Invention

The present invention relates to a multimedia broadcast/multicast service (MBMS) and, more particularly, to transmitting and receiving control information for an MBMS.

2. Description of the Related Art

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access technologies.

A related art UMTS network structure 1 is illustrated in FIG. 1. As shown, a mobile terminal, or user equipment (UE) 2 is connected to a core network (CN) 4 through a UMTS terrestrial radio access network (UTRAN) 6. The UTRAN 6 configures, maintains and manages a radio access bearer for communications between the UE 2 and the core network 4 to meet end-to-end quality of service requirements.

The UTRAN 6 includes a plurality of radio network subsystems (RNS) 8, each of which comprises one radio network controller (RNC) 10 for a plurality base stations, or Node Bs 12. The RNC 10 connected to a given base station 12 is the controlling RNC for allocating and managing the common resources provided for any number of UEs 2 operating in one cell. One or more cells exist in one Node B. The controlling RNC 10 controls traffic load, cell congestion, and the acceptance of new radio links. Each Node B 12 may receive an uplink signal from a UE 2 and may transmit a downlink signals to the UE 2. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and the UTRAN 6 is realized through a radio interface protocol established in accordance with radio access network specifications describing a physical layer (L1), a data link layer (L2) and a network layer (L3) described in, for example 3GPP specifications. These layers are based on the lower three layers of an open system interconnection (OSI) model that is a well-known in communications systems.

A related art architecture of the radio interface protocol is illustrated in FIG. 2. As shown, the radio interface protocol is divided horizontally into the physical layer, the data link layer, and the network layer, and is divided vertically into a user plane for carrying data traffic such as voice signals and Internet protocol packet transmissions and a control plane for carrying control information for the maintenance and management of the interface.

The physical layer (PHY) provides information transfer service to a higher layer and is linked via transport channels to a medium access control (MAC) layer. Data travels between the MAC layer and the physical layer via a transport channel. Also, data transmission is performed through a physical channel between different physical layers, namely, between physical layers of a sending side (transmitter) and a receiving side (transmitter).

The MAC layer of the second layer (L2) provides information transfer service to a higher layer and is linked via a logical channel to a radio link control (RLC) layer. The RLC layer of the second layer (L2) supports the transmission of reliable data and can perform segmentation and concatenation functions for RLC service data units (SDU) received from an upper layer.

The radio resource control (RRC) layer located at the lowest portion of the third layer (L3) is only defined in the control plane and controls transport channels and physical channels with respect to the establishment, re-establishment, and release of radio bearers. A radio bearer (RB) is a service provided by a lower layer, such as the RLC layer or the MAC layer, for transferring data between the UE 2 and the UTRAN 6.

The establishment of an RB determines regulating characteristics of the protocol layer and channel needed to provide a specific service, thereby establishing the parameters and operational methods of the service. When a connection is established to allow transmission between an RRC layer of a specific UE 2 and an RRC layer of the UTRAN 6, the UE 2 is said to be in the RRC-connected state. Without such connection, the UE 2 is in an idle state.

Hereafter, a Multimedia Broadcast/Multicast Service (MBMS or "MBMS service") will be described. MBMS refers to a method of providing streaming or background services to a plurality of UEs 2 using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs 2 within a broadcast area, for example the domain where the broadcast is available. The multicast mode is for transmitting multimedia data to a specific UE 2 group within a multicast area, for example the domain where the multicast service is available.

The UTRAN 6 provides the MBMS service to the UEs 2 using the RB. RBs used by the UTRAN 6 can be classified as a point-to-point RB or a point-to-multipoint RB. The point-to-point RB is a bi-directional RB, including a logical channel DTCH (Dedicated Traffic Channel), a transport channel DCH (Dedicated Channel) and a physical channel DPCH (Dedicated Physical Channel) or SCCPCH (Secondary Common Control Physical Channel).

The point-to-multipoint RB is a uni-directional downlink RB, including a logical channel MTCH (MBMS Traffic Channel), a transport channel FACH (Forward Access Channel), and the physical channel SCCPCH, as shown in FIG. 3.

The logical channel MTCH is configured for each MBMS service provided to one cell and used to transmit user plane data of a specific MBMS service to the UEs 2.

The UTRAN 6 providing the MBMS service transmits MBMS-related control information to the plurality of terminals (UEs 2) through an MCCH (MBMS Control Channel). Herein, the logical channel MCCH is the point-to-multipoint downlink channel and is mapped to the FACH, which is mapped to the SCCPCH. The MBMS-related control information includes a session start for indicating the start of an MBMS service, a session stop for indicating the end of the MBMS service, an RB type indicator for indicating whether the MBMS service is provided via a point-to-point RB or a point-to-multipoint RB, RB information for providing point-to-multipoint RB information such as the MTCH if the RB is a point-to-multipoint RB, counting information for measuring the number of terminals desiring to receive the MBMS service, and re-counting information for re-counting the number of terminals desiring the MBMS service while the MBMS service is being provided.

The MBMS-related control information may be included in an independent message and transmitted, or can be entirely included in one MBMS control message. To transmit various control information related to the MBMS service, the logical channel MCCH is used. Channel mapping of the MCCH is similar to that of the MTCH. Namely, the MCCH is a point-to-multipoint downlink channel and is mapped to the transport channel FACH, which is mapped to the physical channel SCCPCH. For reference, only one MTCH is provided for one service, while only one MCCH is provided for one cell.

The terminal (UE) 2 wishing to receive an MBMS service, must first receive MBMS control information through the MCCH. However, because the terminal 2 can receive only one SCCPCH for the MBMS, and the MCCH is transmitted through a different SCCPCH irrelative to the MTCH, the terminal cannot receive the MCCH if the terminal has already received one or more MBMS services.

An MBMS control information reception indication message (MCCH Indication Message) is used to indicate information to terminals receiving one or more MBMS services, i.e., receiving the MTCH. The MCCH indication message is transmitted through the SCCPCH. The MTCH is also transmitted through the SCCPCH. In order to receive the MBMS data, the mobile terminal 2 receives one SCCPCH. The UTRAN 6 transmits the MCCH indication message through the SCCPCH so that the mobile terminal 2 can receive the control information transmitted through the MCCH. In this case, the MCCH indication message can be transmitted through the MTCH the mobile terminal 2 is receiving, or through an auxiliary channel, such as a Secondary MCCH (S-MCCH), wherein the S-MCCH is mapped to the same SCCPCH as the MTCH. The S-MCCH is an arbitrary channel, which can be a dedicated channel such as a DCCH (Dedicated Control Channel), a common channel such as a CCCH (Common Control Channel), or a new dedicated or common channel. No matter which channel is used, the MCCH indication information is transmitted through the same SCCPCH to which the MTCH is mapped.

The MCCH indication message is a 1-bit indication message. When certain control information is transmitted through the MCCH, the MCCH indication message is used to indicate that the mobile terminal 2 should receive the control information. Namely, when the mobile terminal 2 receives the MCCH indication message in the course of receiving the MTCH, the mobile terminal 2 switches the channel from the SCCPCH through which the MTCH is transmitted to the SCCPCH through which the MCCH is transmitted, and receives the MBMS control information transmitted through the MCCH. After the mobile terminal 2 receives the desired MBMS control information through the MCCH, the mobile terminal 2 then switches the SCCPCH to which the MTCH is mapped and receives the MTCH.

In the related art MCCH indication message, the 1-bit indication message only indicates to the mobile terminal 2 to receive the MCCH. This method is advantageous in that the transmission amount of the indication message can be maximized. However, the related art MCCH indication message also has the following problems. First, the mobile terminal 2 does not know which service the MCCH indication message indicates to receive. Thus, the mobile terminal 2 may receive an MCCH indication message unnecessarily even when control information for a service the mobile terminal 2 does not want to receive is transmitted.

Additionally, the mobile terminal 2 does not know which control information the MCCH indication message indicates to receive. Thus, when various types of control information are continuously transmitted, the mobile terminal 2 does not know which control information to receive, and further does not know at which time the MTCH should be received again. Moreover, if the same control information is transmitted repeatedly several times, the mobile terminal 2 will unnecessarily receive the already-received control message again.

Therefore, in the related art, the mobile terminal 2 frequently receives the MCCH unnecessarily. This is problematic because while the mobile terminal 2 receives the MCCH, it cannot receive the MTCH. Hence, MBMS data is lost. Accordingly, as the mobile terminal 2 reads more MCCHs, the loss of MBMS data increases. A method for minimizing the number of times the MCCH is read by the mobile terminal 2 is therefore required.

SUMMARY OF THE INVENTION

The present invention is directed to a method for transmitting and receiving control information for an MBMS. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for receiving a point-to-multipoint service in a wireless communication system, the method comprising, receiving a control information indication message for a point-to-multipoint service, the control information indication message having attribute information for receiving at least one control information message from a point-to-multipoint control channel, wherein the control information indication message and the at least one control information message are point-to-multipoint messages created from the same protocol layer, determining to receive the at least one control information message according to the attribute information, and receiving the at least one control information message through the point-to-multipoint control channel if a mobile terminal determines to receive the at least one control information message. If the mobile terminal determines not to receive the at least one control information message, the mobile terminal does not receive the at least one control information message.

In accordance with one aspect of the invention, the step of determining to receive the at least one control information message according to the attribute information comprises checking an update of the at least one control information message for the point-to-multipoint service subscribed by the mobile terminal based on the control information indication message and determining to receive the at least one control information message if the at least one control information message is updated.

The method further comprises switching from a previously received traffic channel to the point-to-multipoint control channel to receive the control information message. Preferably, the method comprises switching from a previously received traffic channel to the point-to-multipoint control channel upon determining to receive the at least one control information message. The method also comprises processing the at least one control information message and switching from the point-to-multipoint control channel to a traffic channel to receive the point-to-multipoint service.

In accordance with another aspect of the invention, the attribute information comprises a point-to-multipoint service ID associated with the point-to-multipoint service. Furthermore, the step of determining to receive the at least one control information message according to the attribute information comprises checking the point-to-multipoint service ID if the point-to-multipoint service ID is included in the attribute information and determining which control information message is to be received from the point-to-multipoint control channel if the point-to-multipoint service ID is related to a point-to-multipoint service subscribed by the mobile terminal.

If the point-to-multipoint service ID is not related to the point-to-multipoint service subscribed by the mobile terminal, the mobile terminal continues to receive a traffic channel previously received prior to receiving the control information indication message. The traffic channel may be one of a point-to-multipoint traffic channel and a point-to-point traffic channel.

Preferably, the attribute information comprises at least one of a control information identifier associated with the at least one control information message, update information associated with the at least one control information message, and timing information associated with the point-to-multipoint service. The update information indicates the update information of the at least one control information message for the point-to-multipoint service.

The timing information indicates which part of the point-to-multipoint control channel is to be received. Preferably, the timing information indicates a start time of the point-to-multipoint control channel reception. Also, the mobile terminal may receive the point-to-multipoint control channel during a duration according to the timing information. Alternatively, the mobile terminal stops receiving the point-to-multipoint control channel at an end time according to the timing information.

In accordance with a further aspect of the invention, the method comprises checking the control information identifier if the control information identifier is included in the attribute information and receiving the at least one control information message if the control information identifier is related to the mobile terminal.

In accordance with one aspect of the invention, the method comprises checking the update information if the update information is included in the attribute information, comparing the update information to previously stored update information, and receiving the at least one control information message if no update information has been previously stored or if the update information is different from the previously stored update information.

In accordance with another aspect of the invention, the method comprises checking the timing information if the timing information is included in the attribute information and receiving the at least one control information message according to a time interval indicated by the timing information.

Preferably, the control information indication message is received through an MTCH, the control information indication message is received through an S-MCCH, the point-to-multipoint control channel is an MCCH, and the traffic channel is an MTCH.

In accordance with another embodiment of the invention, a method for transmitting a point-to-multipoint service in a wireless communication system comprises transmitting a control information indication message for a point-to-multipoint service to a mobile terminal, the control information indication message having attribute information for transmitting at least one control information message through a point-to-multipoint control channel, wherein the control information indication message and the at least one control information message are point-to-multipoint messages created from the same protocol layer, and transmitting the at least one control information message through the point-to-multipoint control channel.

In accordance with one aspect of the invention, the mobile terminal determining to receive the at least one control information message comprises checking an update of the at least one control information message for the point-to-multipoint service subscribed by the mobile terminal based on the control information indication message and determining to receive the at least one control information message if the at least one control information message is updated.

In accordance with another aspect of the invention, the mobile terminal determines to receive the at least one control information message according to the attribute information, wherein the attribute information comprises a point-to-multipoint service ID associated with the point-to-multipoint service.

A method for the mobile terminal determining to receive the at least one control information message according to the attribute information comprises checking the point-to-multipoint service ID if the point-to-multipoint service ID is included in the attribute information and determining which control information message is to be received from the point-to-multipoint control channel if the point-to-multipoint service ID is related to a point-to-multipoint service subscribed by the mobile terminal.

If the point-to-multipoint service ID is not related to the point-to-multipoint service subscribed by the mobile terminal, the mobile terminal continues to receive a traffic channel previously received prior to receiving the control information indication message. Preferably, the traffic channel is one of a point-to-multipoint traffic channel and a point-to-point traffic channel.

In accordance with one aspect of the invention, the attribute information comprises at least one of a control information identifier associated with the at least one control information message, update information associated with the at least one control information message, and timing information associated with the point-to-multipoint service. The update information indicates the update information of the at least one control information message for the point-to-multipoint service.

The timing information indicates which part of the point-to-multipoint control channel is to be received by the mobile terminal. Also, the timing information indicates a start time of the point-to-multipoint control channel transmission. Preferably, the network transmits the point-to-multipoint control channel during a duration according to the timing information. Alternatively, the network stops transmitting the point-to-multipoint control channel at an end time according to the timing information.

In accordance with another aspect of the invention, a method for the mobile terminal determining to receive the at least one control information message according to the attribute information comprises checking the control information identifier if the control information identifier is included in the attribute information and receiving the at least one control information message if the control information identifier is related to the mobile terminal.

In accordance with a further aspect of the invention, a method for the mobile terminal determining to receive the at least one control information message according to the attribute information comprises checking the update information if the update information is included in the attribute information, comparing the update information to previously stored update information, and receiving the at least one control information message if no update information has been previously stored or if the update information is different from the previously stored update information.

In accordance with another aspect of the invention, a method for the mobile terminal determining to receive the at least one control information message according to the attribute information comprises checking the timing information if the timing information is included in the attribute information, and receiving the at least one control information message according to a time interval indicated by the timing information.

Preferably, the control information indication message is transmitted through an MTCH, the control information indication message is transmitted through an S-MCCH, the point-to-multipoint control channel is an MCCH, and the traffic channel is an MTCH.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
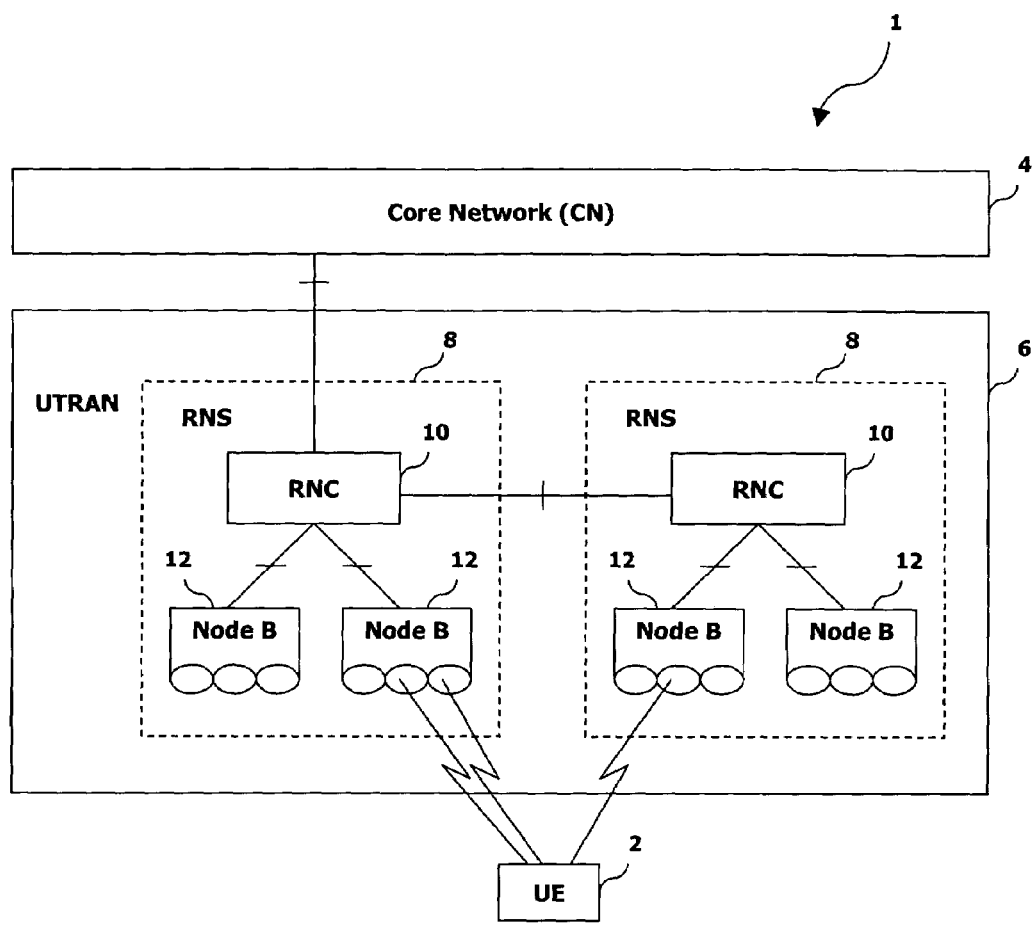
FIG. 1 illustrates a related art network structure of a wireless communication system.
Figure 2:
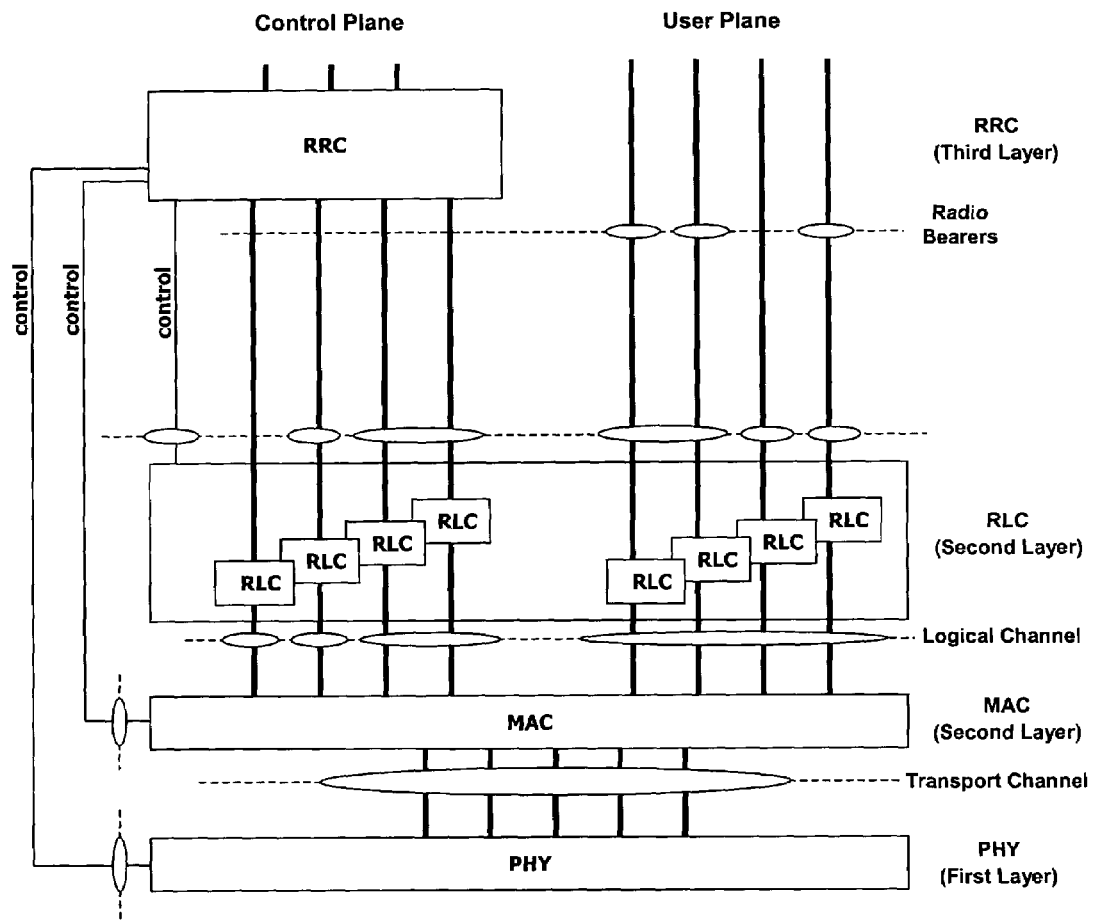
FIG. 2 illustrates a related art radio interface protocol architecture based on a radio access network specification between the UE and the UTRAN.
Figure 3:
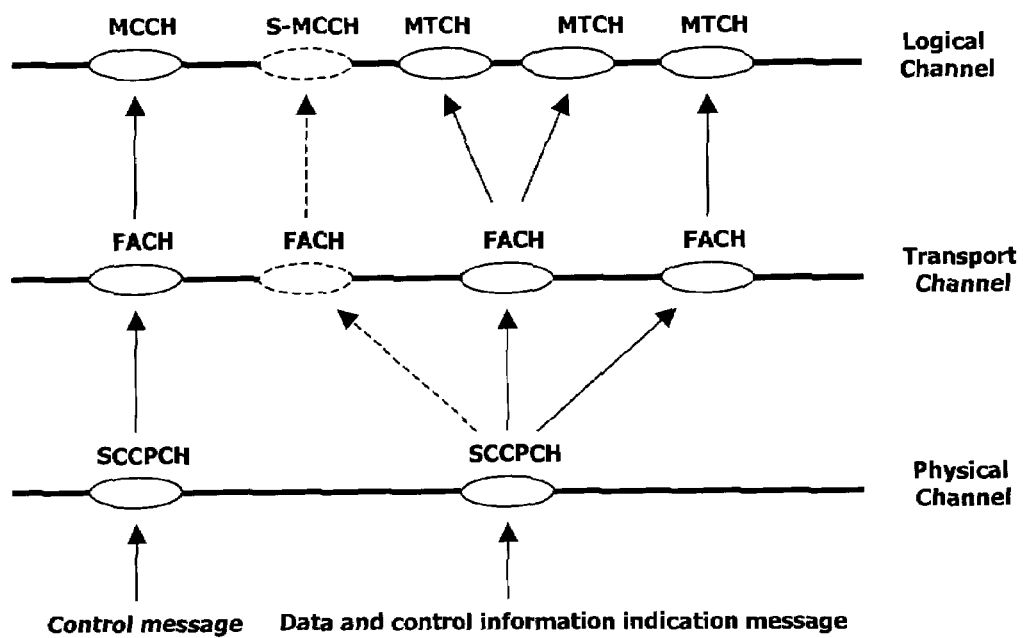
FIG. 3 illustrates related art channel mapping for an MBMS service for a mobile terminal.

The present invention relates to a method for minimizing data loss as a mobile terminal unnecessarily reads an MCCH for receiving MBMS control information in the course of receiving MBMS data. For this purpose, the present invention provides a method for constructing an MBMS control information reception indication message (MCCH indication message) and a method for receiving the MBMS control information using the same.

Although the present invention is implemented in a mobile communication system, such as a UMTS developed under 3GPP specifications, the present invention can also be applied to a communication system operating in conformity with a different specification.

In accordance with a preferred embodiment of the present invention, an MCCH indication message comprises a service ID for identifying which service the control information is transmitted for and an RRC message ID for indicating what kind of control information is transmitted. The MCCH indication message further comprises update information for indicating whether a currently transmitted MCCH indication message or currently transmitted control information (RRC message) transmitted through the MCCH is new or updated information or previously transmitted information. The MCCH indication message also includes timing information for indicating a time interval for receiving the MCCH.

The MCCH indication message is preferably transmitted through the MTCH which is being received by the mobile terminal or through the S-MCCH mapped to the SCCPCH that transmits the MTCH. The MCCH indication message may include at least one of the service ID, the RRC message ID, the update information and the timing information.

The RRC message ID includes a session start information for indicating the start of an MBMS service, a session stop information for indicating the end of the MBMS service, an RB type indicator for indicating what type of RB the MBMS services is provided by, RB information for providing point-to-multipoint RB information such as the MTCH if the RB type is a point-to-multipoint RB, counting information for measuring the number of terminals desiring to receive the MBMS service, and re-counting information for re-counting the number of terminals desiring the MBMS service while the MBMS service is being provided.

The update information is a type of value tag for informing the mobile terminal (UE) of the newness of a transmitted MCCH indication message or RRC message. The update information may be divided into two types. One type is update information related to an MCCH indication message. The other type is update information related to an RRC message. Notably, the mobile terminal operates differently depending on the type of the update information.

If the update information is update information related to the MCCH indication message, the mobile terminal stores the update information of an MCCH indication message whenever the corresponding MCCH indication message is received. Furthermore, when an MCCH indication message is received, the mobile terminal compares the received update information included in the MCCH indication message with the previously stored update information. If no update information has been previously stored or if the two update information are different, the mobile terminal determines that the currently received update information is new information. If, however, the two update information are the same, the mobile terminal determines that the currently received update information is the same as the previously stored update information.

If the update information is update information related to the RRC message, the MCCH indication message comprises the RRC message ID and the update information. When the terminal receives the MCCH indication message, it stores corresponding update information for each RRC message. Moreover, if a new MCCH indication message is received, the terminal compares the update information received with respect to the RRC message ID and previously stored update information. If no update information has been stored or if the two update information are different, the mobile terminal determines that the currently received update information is new information. If, however, the two update information are the same, the mobile terminal determines that the currently received update information is the same as the previously stored update information.

The timing information indicates information related to a time interval for the mobile terminal to receive the MCCH. The time interval information may include at least one of an MCCH reception start time, reception end time and reception interval time. The time interval information may be general timing information, frame information or slot information.

If a service ID is included in the MCCH indication message, the mobile terminal checks the service ID. If the service ID is not related to the mobile terminal or to a service the mobile terminal is currently receiving or desires to receive, the mobile terminal disregards the received MCCH indication message and continues to receive the MTCH. If, however, the service ID corresponds to an MBMS service being received or desired to be received, the mobile terminal receives the control information transmitted through the MCCH by switching the reception channel from the MTCH to the MCCH.

If the RRC message ID is included in the MCCH indication message, the mobile terminal checks the RRC message ID. The mobile terminal then switches the reception channel from the MTCH to the MCCH to specifically receive the control information indicated by the RRC message ID among all control information transmitted through the MCCH.

If the update information is included in the MCCH indication message, the mobile terminal checks whether the received indication message is a new message by comparing the received update information with previously stored update information. If the received update information is the same as the previously stored update information, the mobile terminal determines that the received MCCH indication message is the same as a previously received MCCH indication message. Accordingly, the mobile terminal disregards the received MCCH indication message and continues to receive the MTCH. If, however, no update information has been previously stored or if the received update information is different from the previously stored update information, the mobile terminal stores the received update information and receives the control information transmitted through the MCCH by switching from the MTCH to the MCCH.

Also, if the timing information is included in the MCCH indication message, the mobile terminal receives the MCCH by switching the reception channel from the MTCH to the MCCH during a time interval indicated by the received timing information. If the timing information includes a reception start time, the mobile terminal begins receiving the MCCH from the start time indicated. If the timing information includes a reception end time, the mobile terminal terminates reception of the MCCH at the end time indicated. If the timing information includes a reception interval time, the mobile terminal receives the MCCH during the time interval indicated.

Preferably, the MCCH indication message includes at least one of the service ID, the RRC message ID, the update information and the timing information. If at least one of these pieces of information are included in the MCCH indication message, the mobile terminal receives control information by performing a separate operation for each piece of information as described above.

For example, if the MCCH indication message includes the service ID and the RRC message ID, the mobile terminal checks the service ID. If the received service ID is not related to the mobile terminal, the terminal disregards the received MCCH indication message and continues receiving the MTCH. If, however, the received service ID is a service ID of an MBMS being received or desired to be received by the mobile terminal, the terminal switches from the MTCH to the MCCH to receive control information transmitted through the MCCH. When the terminal receives the control information indicated by the RRC message ID among all control information transmitted through the MCCH, the mobile terminal operates according to the corresponding control information.

If the service ID and the update information are included in the MCCH indication message, the terminal checks the service ID. If the received service ID is not related to the mobile terminal, the terminal disregards the received MCCH indication message and continues receiving the MTCH. If, however, the received service ID is a service ID of an MBMS being received or desired to be received by the mobile terminal, the terminal additionally checks the update information. If the received update information is the same as previously stored update information, the terminal disregards the received MCCH indication message and continues receiving the MTCH. If, however, there is no stored update information or if the previously stored update information is different from the currently received update information, the terminal stores the received update information. The mobile terminal then receives control information transmitted through the MCCH by switching from MTCH to the MCCH.

If the MCCH indication message includes the RRC message ID and the update information, the terminal checks whether the received MCCH indication message or the RRC message to be transmitted through the MCCH is a new message by comparing the received update information with previously stored update information. If the received update information is the same as the previously stored update information, the mobile terminal disregards the received MCCH indication message and continues receiving the MTCH. If, however, there is no stored update information or if the previously stored update information is different from the currently received update information, the mobile terminal stores the received update information related to the MCCH indication message or the RRC message. The mobile terminal then switches from the MTCH to the MCCH to receive control information transmitted through the MCCH. When the mobile terminal receives the control information indicated by the RRC message ID among all the control information transmitted through the MCCH, the terminal performs a follow-up operation according to the corresponding control information.

As described above, the present invention presents the case where the MCCH indication message includes two among the service ID, the RRC message ID and the update information. However, the present invention can readily be applied to the case where the MCCH indication message includes two or three among the service ID, the RRC message, the update information and the timing information, wherein the mobile terminal separately processes a corresponding operation with respect to each piece of information and receives control information accordingly.

Figure 4:
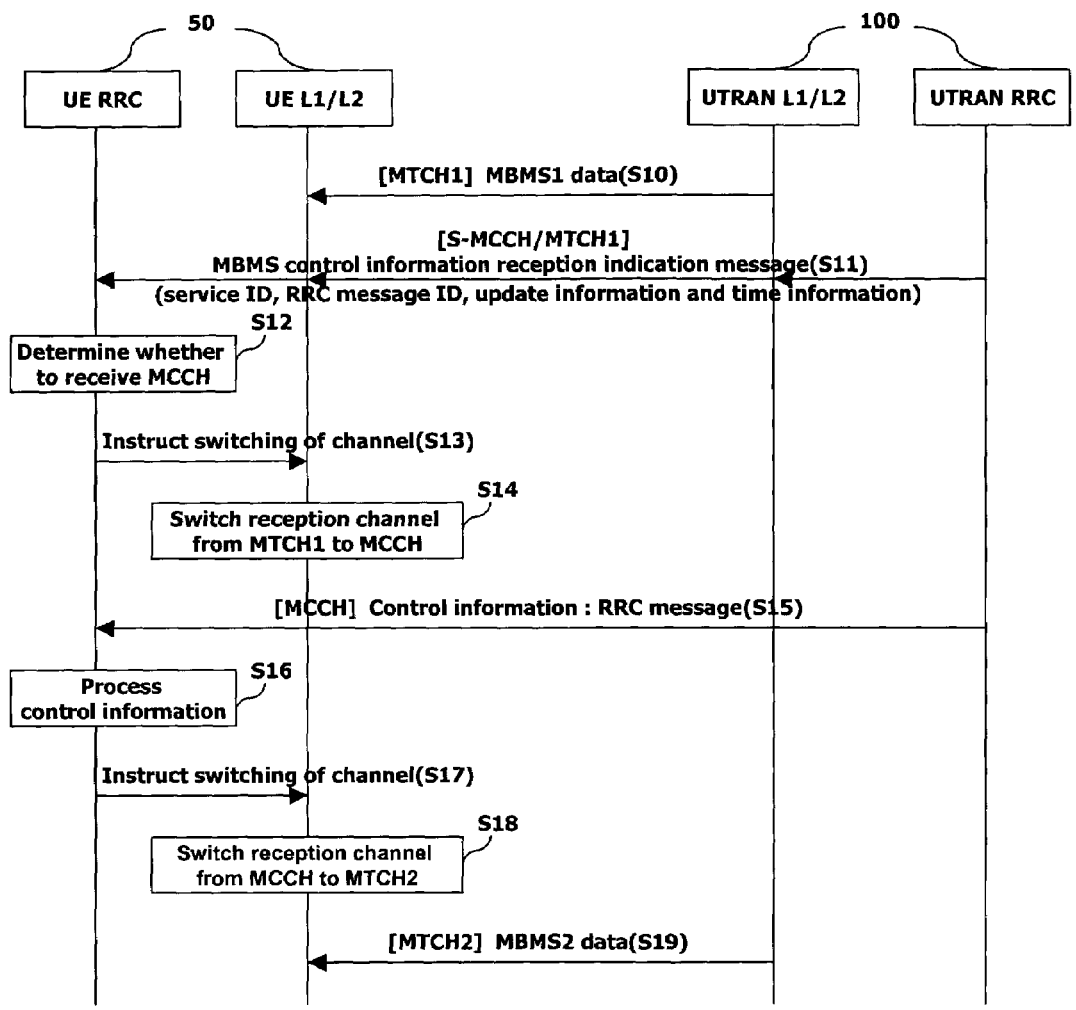
FIG. 4 illustrates a diagram for selectively transmitting and receiving control information for an MBMS service in accordance with one embodiment of the invention.

In accordance with a preferred embodiment of the invention, a method for selectively transmitting and receiving control information for an MBMS service is illustrated in FIG. 4. As shown, while a mobile terminal (UE) 50 is provided with a first MBMS service (MBMS1), a second MBMS service (MBMS2) begins. Accordingly, a UTRAN 100 informs the mobile terminal 50 about a session start of the second MBMS service. Here, an MCCH indication message includes a service ID, an RRC message ID, update information and timing information.

The terminal 50 receives MBMS 1 data at an L1/L2 layer through an MTCH1 (step S10). An RRC of the terminal 50 receives the MCCH indication message through the MTCH1 or the S-MCCH in the course of receiving the MBMS1 data (step S11). Here, the MCCH indication message is a control information reception indication message for the MBMS2. At this time, it is assumed that the service ID has a value of 2 and the RRC message ID indicates a session start. Both the service ID and the RRC message ID are transmitted through the MCCH indication message.

The mobile terminal 50 checks the service ID and determines whether the MBMS2 service is a service the mobile terminal 50 desires to receive. If the MBMS2 is a service the mobile terminal 50 desires to receive, the terminal checks the update information to determine whether control information to be transmitted is new and whether the MCCH is to be received (step S12). If the MCCH is determined to be received, the RRC of the terminal 50 instructs lower layers, such as the PHY/MAC/RLC (L1/L2 layers), to switch the reception channel from the MTCH1 to the MCCH at a time indicated by the timing information (step S13). According to the instruction of the RRC of the terminal, the lower layers switch the reception channel from the MTCH1 to the MCCH (step S14). Consequently, because the MTCH1 and the MCCH are mapped to a different SCCPCH, the physical channel is also switched.

Thereafter, the terminal RRC continuously receives an RRC message indicated by the RRC message ID through the MCCH (step S15). Preferably, the terminal RRC receives a session start message of the MBMS2.

Upon receiving the session start information of the MBMS2, the terminal RRC determines whether to continuously receive the MBMS1 or the new MBMS2. In this case, a user is informed about the session start of the MBMS2 and a follow-up operation is determined according to the user's decision (step S16). In this embodiment, it is assumed that the user desires to receive the MBMS2.

As the user determines to receive the new MBMS2, the terminal RRC instructs the lower layers such as the PHY/MAC/RLC to switch the reception channel from the MCCH to the MTCH2 (step S17). Accordingly, the lower layers switch the reception channel from the MCCH to the MTCH2 so that the mobile terminal 50 (UE L1/L2) can receive MBMS2 data at the L1/L2 layer through the MTCH2.

As so far described, the method for transmitting and receiving control information for an MBMS service in accordance with the present invention has many advantages. For example, if the terminal receives the MBMS control information reception indication message (MCCH indication message) in the course of receiving one or more MBMS services, the service ID, the RRC message ID and the update information included in the MBMS control information reception indication message are checked to determine whether to receive the MCCH. The mobile terminal is thus prevented from unnecessarily receiving the MCCH when control information to be received through the MCCH has already been received by the mobile terminal or when control information to be received corresponds to a service unrelated to the mobile terminal. Thus, a loss of MBMS data due to the unnecessary reception of the MCCH can be reduced.

In addition, the timing information is included and transmitted in the MBMS control information reception indication message. This prevents the mobile terminal from receiving the MCCH for an unnecessarily long time. Therefore, the loss of MBMS data is further reduced.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for receiving a point-to-multipoint service in a wireless communication system, the method comprising:

receiving a control information indication message for a point-to-multipoint service, the control information indication message having attribute information for receiving at least one control information message from a point-to-multipoint control channel, wherein the control information indication message and the at least one control information message are point-to-multipoint messages created from the same protocol layer;

determining to receive the at least one control information message according to the attribute information; and receiving the at least one control information message through the point-to-multipoint control channel if a mobile terminal determines to receive the at least one control information message, wherein determining to receive the at least one control information message according to the attribute information comprises:

checking an update of the at least one control information message for the point-to-multipoint service subscribed by the mobile terminal based on the control information indication message; and determining to receive the at least one control information message if the at least one control information message is updated.

2. The method of claim 1, wherein if the mobile terminal determines not to receive the at least one control information message, the mobile terminal does not receive the at least one control information message.

3. The method of claim 1, further comprising switching from a previously received traffic channel to the point-to-multipoint control channel to receive the control information message.

4. The method of claim 3, further comprising switching from a previously received traffic channel to the point-to-multipoint control channel upon determining to receive the at least one control information message.

5. The method of claim 1, further comprising:
processing the at least one control information message; and
switching from the point-to-multipoint control channel to a traffic channel to receive the point-to-multipoint service.

6. The method of claim 5, wherein the traffic channel is an MTCH.

7. The method of claim 1, wherein the attribute information comprises a point-to-multipoint service ID associated with the point-to-multipoint service.

8. The method of claim 1, wherein the attribute information comprises at least one of:
a control information identifier associated with the at least one control information message;
update information associated with the at least one control information message; and
timing information associated with the point-to-multipoint service.

9. The method of claim 8, wherein the update information indicates the update information of the at least one control information message for the point-to-multipoint service.

10. The method of claim 8, wherein the timing information indicates which part of the point-to-multipoint control channel is to be received.

11. The method of claim 8, wherein the timing information indicates a start time of the point-to-multipoint control channel reception.

12. The method of claim 8, wherein the mobile terminal receives the point-to-multipoint control channel during a duration according to the timing information.

13. The method of claim 8, wherein the mobile terminal stops receiving the point-to-multipoint control channel at an end time according to the timing information.

14. The method of claim 8, further comprising:
checking the control information identifier if the control information identifier is included in the attribute information; and
receiving the at least one control information message if the control information identifier is related to the mobile terminal.

15. The method of claim 8, further comprising:
checking the update information if the update information is included in the attribute information;
comparing the update information to previously stored update information; and
receiving the at least one control information message if no update information has been previously stored or if the update information is different from the previously stored update information.

16. The method of claim 8 further comprising:
checking the timing information if the timing information is included in the attribute information; and
receiving the at least one control information message according to a time interval indicated by the timing information.

17. The method of claim 1, wherein the control information indication message is received through an MTCH.

18. The method of claim 1, wherein the control information indication message is received through an S-MCCH.

19. The method of claim 1, wherein the point-to-multipoint control channel is an MCCH.

20. A method for receiving a point-to-multipoint service in a wireless communication system, the method comprising:
receiving a control information indication message for a point-to-multipoint service, the control information indication message having attribute information for receiving at least one control information message from a point-to-multipoint control channel, wherein the control information indication message and the at least one control information message are point-to-multipoint messages created from the same protocol layer and the attribute information comprises a point-to-multipoint service ID associated with the point-to-multipoint service;

determining to receive the at least one control information message according to the attribute information; and receiving the at least one control information message through the point-to-multipoint control channel if a mobile terminal determines to receive the at least one control information message, wherein determining to receive the at least one control information message according to the attribute information comprises:

checking the point-to-multipoint service ID if the point-to-multipoint service ID is included in the attribute information; and determining which control information message is to be received from the point-to-multipoint control channel if the point-to-multipoint service ID is related to a point-to-multipoint service subscribed by the mobile terminal.

21. The method of claim 20, wherein if the point-to-multipoint service ID is not related to the point-to-multipoint service subscribed by the mobile terminal, the mobile terminal continues to receive a traffic channel previously received prior to receiving the control information indication message.

22. The method of claim 21, wherein the traffic channel is one of a point-to-multipoint traffic channel and a point-to-point traffic channel.

23. A method for transmitting a point-to-multipoint service in a wireless communication system, the method comprising:

transmitting a control information indication message for a point-to-multipoint service to a mobile terminal, the control information indication message having attribute information for transmitting at least one control information message through a point-to-multipoint control channel, wherein the control information indication message and the at least one control information message are point-to-multipoint messages created from the same protocol layer; and transmitting the at least one control information message through the point-to-multipoint control channel, wherein when the mobile terminal determines to receive the at least one control information message, determining by the mobile terminal comprises:

checking an update of the at least one control information message for the point-to-multipoint service subscribed by the mobile terminal based on the control information indication message; and determining to receive the at least one control information message if the at least one control information message is updated.

24. The method of claim 23, wherein the mobile terminal determines to receive the at least one control in formation message according to the attribute information.

25. The method of claim 24, wherein the attribute information comprises a point-to-multipoint service ID associated with the point-to-multipoint service.

26. The method of claim 23, wherein the attribute information comprises at least one of:

a control information identifier associated with the at least one control information message;

update information associated with the at least one control information message; and timing information associated with the point-to-multipoint service.

27. The method of claim 26, wherein the update information indicates the update information of the at least one control information message for the point-to-multipoint service.

28. The method of claim 26, wherein the timing information indicates which part of the point-to-multipoint control channel is to be received by the mobile terminal.

29. The method of claim 26, wherein the timing information indicates a start time of the point-to-multipoint control channel transmission.

30. The method of claim 26, wherein the network transmits the point-to-multipoint control channel during a duration according to the timing information.

31. The method of claim 26, wherein the network stops transmitting the point-to-multipoint control channel at an end time according to the timing information.

32. The method of claim 23, wherein the control information indication message is transmitted through an MTCH.

33. The method of claim 23, wherein the control information indication message is transmitted through an S-MCCH.

34. The method of claim 23, wherein the point-to-multipoint control channel is an MCCH.

35. A method for transmitting a point-to-multipoint service in a wireless communication system, the method comprising:

transmitting a control information indication message for a point-to-multipoint service to a mobile terminal, the control information indication message having attribute information for transmitting at least one control information message through a point-to-multipoint control channel, wherein the control information indication message and the at least one control information message are point-to-multipoint messages created from the same protocol layer and the attribute information comprises a point-to-multipoint service ID associated with the point-to-multipoint service; and transmitting the at least one control information message through the point-to-multipoint control channel, wherein the mobile terminal determines to receive the at least one control information message according to the attribute information and determining to receive the at least one control information message according to the attribute information comprises:

checking the point-to-multipoint service ID if the point-to-multipoint service ID is included in the attribute information; and determining which control information message is to be received from the point-to-multipoint control channel if the point-to-multipoint service ID is related to a point-to-multipoint service subscribed by the mobile terminal.

36. The method of claim 35, wherein if the point-to-multipoint service ID is not related to the point-to-multipoint service subscribed by the mobile terminal, the mobile terminal continues to receive a traffic channel previously received prior to receiving the control information indication message.

37. The method of claim 36, wherein the traffic channel is one of a point-to-multipoint traffic channel and a point-to-point traffic channel.

38. The method of claim 36, wherein the traffic channel is an MTCH.

39. A method for transmitting a point-to-multipoint service in a wireless communication system, the method comprising:

transmitting a control information indication message for a point-to-multipoint service to a mobile terminal, the control information indication message having attribute information for transmitting at least one control information message through a point-to-multipoint control channel, wherein the control information indication message and the at least one control information message are point-to-multipoint messages created from the same protocol layer and the attribute information comprises at least one of a control information identifier associated with the at least one control information message, update information associated with the at least one control information message, or timing information associated with the point-to-multipoint service; and transmitting the at least one control information message through the point-to-multipoint control channel, wherein when the mobile terminal determines to receive the at least one control information message according to the attribute information, the determining by the mobile terminal comprises:

checking the control information identifier if the control information identifier is included in the attribute information; and receiving the at least one control information message if the control information identifier is related to the mobile terminal.

40. A method for transmitting a point-to-multipoint service in a wireless communication system, the method comprising:

transmitting a control information indication message for a point-to-multipoint service to a mobile terminal, the control information indication message having attribute information for transmitting at least one control information message through a point-to-multipoint control channel, wherein the control information indication message and the at least one control information message are point-to-multipoint messages created from the same protocol layer and the attribute information comprises at least one of a control information identifier associated with the at least one control information message, update information associated with the at least one control information message, or timing information associated with the point-to-multipoint service; and transmitting the at least one control information message through the point-to-multipoint control channel, wherein when the mobile terminal determines to receive the at least one control information message according to the attribute information, the determining by the mobile terminal comprises:

checking the update information if the update information is included in the attribute information;

comparing the update information to previously stored update information; and receiving the at least one control information message if no update information has been previously stored or if the update information is different from the previously stored update information.

41. A method for transmitting a point-to-multipoint service in a wireless communication system, the method comprising:

transmitting a control information indication message for a point-to-multipoint service to a mobile terminal, the control information indication message having attribute information for transmitting at least one control information message through a point-to-multipoint control channel, wherein the control information indication message and the at least one control information message are point-to-multipoint messages created from the same protocol layer and the attribute information comprises at least one of a control information identifier associated with the at least one control information message, update information associated with the at least one control information message, or timing information associated with the point-to-multipoint service; and transmitting the at least one control information message through the point-to-multipoint control channel, wherein when the mobile terminal determines to receive the at least one control information message according to the attribute information, the determining by the mobile terminal comprises:

checking the timing information if the timing information is included in the attribute information; and receiving the at least one control information message according to a time interval indicated by the timing information.

* * * * *